United States Patent
Kato et al.

(10) Patent No.: US 7,858,153 B2
(45) Date of Patent: Dec. 28, 2010

(54) POWDER PRIMER COMPOSITION AND METHOD FOR FORMING COATING FILM

(75) Inventors: Yoshinori Kato, Hiratsuka (JP); Akinari Niimi, Aichi (JP); Yugen Kawamoto, Hiratsuka (JP)

(73) Assignee: Kansai Paing Co., Ltd., Amagasaki-Shi (JP)

( * ) Notice: Subject to any disclaimer, the term of this patent is extended or adjusted under 35 U.S.C. 154(b) by 737 days.

(21) Appl. No.: 11/790,406

(22) Filed: Apr. 25, 2007

(65) Prior Publication Data
US 2007/0255015 A1 Nov. 1, 2007

(30) Foreign Application Priority Data
Apr. 26, 2006 (JP) ............................. 2006-121800
Apr. 27, 2006 (JP) ............................. 2006-123106

(51) Int. Cl.
*B05D 1/04* (2006.01)
*C08L 63/00* (2006.01)
*C08L 67/00* (2006.01)
*B05D 1/36* (2006.01)
*B05D 1/38* (2006.01)
*B32B 15/09* (2006.01)
*B32B 15/092* (2006.01)

(52) U.S. Cl. ........................ 427/470; 427/409; 427/410; 427/458; 427/532; 428/416; 428/418; 428/480; 525/438; 525/523; 525/524; 525/533

(58) Field of Classification Search ........................ None
See application file for complete search history.

(56) References Cited

U.S. PATENT DOCUMENTS

| | | | | |
|---|---|---|---|---|
| 4,767,832 A | * | 8/1988 | Marx | 525/523 |
| 5,248,400 A | * | 9/1993 | Franks et al. | 204/488 |
| 5,714,264 A | * | 2/1998 | Sacharski et al. | 428/413 |
| 6,599,993 B1 | * | 7/2003 | Norris et al. | 525/438 |
| 2004/0236037 A1 | * | 11/2004 | December et al. | 525/525 |

FOREIGN PATENT DOCUMENTS

| | | |
|---|---|---|
| JP | 6-279709 A | 10/1994 |
| JP | 7-18207 A | 1/1995 |
| JP | 2002-146277 A | 5/2002 |
| JP | 2005-162929 A | 6/2005 |
| JP | 2005-248046 A | 9/2005 |

OTHER PUBLICATIONS

Machine translation of JP 2005-162929 A, provided by the JPO website (2005).*

* cited by examiner

*Primary Examiner*—Michael J Feely
(74) *Attorney, Agent, or Firm*—Millen, White, Zelano, Branigan, P.C.

(57) ABSTRACT

A powder primer composition comprising as essential components (A) a carboxyl group-containing thermosetting polyester resin, (B1) a bisphenol A-type epoxy resin with an epoxy equivalent of 400-2000 g/eq or (B2) a bisphenol-type epoxy resin with an epoxy equivalent of 400-2000 g/eq and (C1) a bisphenol F-type epoxy resin with an epoxy equivalent of 400-2000 g/eq or (C2) a modified epoxy resin containing phenolic hydroxyl groups, obtained by reacting (a) a bifunctional epoxy resin with (b) an excess of a bifunctional phenol. Coating films obtained using the powder primer composition have excellent finished appearance and corrosion resistance.

13 Claims, No Drawings

POWDER PRIMER COMPOSITION AND METHOD FOR FORMING COATING FILM

BACKGROUND OF THE INVENTION (1) Field of the Invention

The present invention relates to a powder primer composition and to a method of forming a coating film that employs the powder primer composition.

(2) Description of Related Art

Steel and aluminum wheels are commonly used as automobile parts. Such wheels are required to have a high level of corrosion resistance and an excellent level of design, and there are commonly employed wheels made of aluminum (hereinafter referred to as "aluminum wheels") that have excellent lightweight properties, which for protection and aesthetic quality are usually coated with, for example, a thermosetting powder primer, subsequently heat cured, and then further coated with a thermosetting acrylic resin-based solvent-type coating as a top coat. Aluminum wheels with a sheen design are coated with a thermosetting powder primer composition, heat cured and then coated with a bright thermosetting acrylic resin-based solvent-type coating as a top coat, further heat cured, and processed by cutting. They are then still further coated with an additional thermosetting acrylic resin-based clear coating.

In such coating methods, however, problems occur at the cut sections where the powder coating film remains as burrs or the coating film is lost, creating severe irregularities between the cut surface and the non-cut surface.

In order to solve these problems, there have been proposed methods in which powder coating is carried out in such a manner that the cured coating film that has been clear coated on a cut aluminum wheel with a bright design has a minimum dynamic elastic modulus (E') of at least $5 \times 10^7$ Pa (for example, Japanese Unexamined Patent Publication No. 7-18207). Methods of applying powder coatings employing resins composed mainly of bisphenol A-type epoxy resins are also known (for example, Japanese Unexamined Patent Publication No. 6-279709). However, although such methods offer improved machinability, the storage stability of the powder coatings has been insufficient.

The present applicant has already proposed a powder primer composition whose essential components are a carboxyl group-containing polyester resin, an epoxy resin, a phosphoric acid-modified epoxy resin and a rust-preventive pigment (for example, Japanese Unexamined Patent Publication No. 2005-162929 and Japanese Unexamined Patent Publication No. 2005-248046). The powder primer composition has excellent storage stability, and can form coating films with superior finished appearance, cutting machinability, corrosion resistance and chipping resistance. Nevertheless, depending on the ratio of the compounding ingredients in the powder primer composition, the crosslink density of the formed coating film is sometimes too high, increasing the internal stress and resulting in reduced corrosion resistance.

BRIEF SUMMARY OF THE INVENTION

It is an object of the present invention to solve the problems described above by providing a powder primer composition which is able to form coating films with excellent finished appearance and corrosion resistance, as well as a method of forming a coating film that employs the powder primer composition.

In order to solve the problems, the invention provides a powder primer composition with a specific composition and a method of forming a coating film that employs the composition, and for example, it relates to the following (1)-(13).

(1) A powder primer composition comprising as essential components (A) a carboxyl group-containing polyester resin, (B1) a bisphenol A-type epoxy resin with an epoxy equivalent of 400-2000 g/eq and (C1) a bisphenol F-type epoxy resin with an epoxy equivalent of 400-2000 g/eq, the powder primer composition being characterized in that the ratio of the contents of components (B1) and (C1) is 25/75-75/25 based on the solid weight of both components.

(2) A powder primer composition characterized by comprising as essential components (A) a carboxyl group-containing polyester resin, (B2) a bisphenol-type epoxy resin with an epoxy equivalent of 400-2000 g/eq and (C2) a modified epoxy resin containing phenolic hydroxyl groups, obtained by reacting (a) a bifunctional epoxy resin with (b) an excess of a bifunctional phenol.

(3) A powder primer composition according to (2) above, wherein the bisphenol-type epoxy resin (B2) contains a bisphenol A-type epoxy resin and a bisphenol F-type epoxy resin.

(4) A powder primer composition according to (2) or (3) above, wherein the bifunctional epoxy resin (a) is a bisphenol A-type epoxy resin with a number-average molecular weight of 500-2000, and the bifunctional phenol (b) is bisphenol A.

(5) A powder primer composition according to (2) or (3) above, wherein the bifunctional epoxy resin (a) is a bisphenol A-type epoxy resin with a number-average molecular weight of 500-2000, and the bifunctional phenol (b) is bisphenol F.

(6) A powder primer composition according to (2) or (3) above, wherein the bifunctional epoxy resin (a) is a bisphenol F-type epoxy resin with a number-average molecular weight of 1000-2000, and the bifunctional phenol (b) is bisphenol A.

(7) A powder primer composition according to any one of (1) to (6) above, which further comprises (D) a phosphoric acid-modified epoxy resin.

(8) A powder primer composition according to (7) above, wherein the phosphoric acid-modified epoxy resin (D) is obtained by reacting (c) a phosphoric acid ester compound with at least one P—OH bond in the molecule, obtained by reacting a monoglycidyl ether compound and/or monoglycidyl ester compound with phosphoric acid, and (d) an epoxy compound with at least one epoxy group in the molecule.

(9) A powder primer composition according to any one of (1) to (8) above, which further comprises (E) a hydroxyl group-containing polymer.

(10) A method of forming a coating film characterized by electrostatic powder coating of a powder primer composition according to any one of (1) to (9) above onto an article to be coated composed of a metal material, to form a primer coating film layer.

(11) A method of forming a coating film according to (10) above, wherein the article to be coated is an aluminum wheel for an automobile.

(12) A method of forming a coating film according to (10) or (11), which includes a step of forming a coloring base coating film layer onto the surface of the primer coating film layer.

(13) A method of forming a coating film according to (12) above, which includes a step of forming a top clear coating film layer onto the surface of the coloring base coating film layer.

The powder primer composition of the invention comprising a specific epoxy resin component allows formation of coating films with reduced internal stress of formed coating films, as well as superior corrosion resistance, top coating film adhesion and finished appearance, and it is therefore highly useful as a primer for metal products such as aluminum wheels.

DETAILED DESCRIPTION OF THE INVENTION

Preferred modes of the invention will now be explained in detail with the understanding that the invention is not limited only to these modes, and various modifications may be implemented that are within the spirit and scope of the invention.

The polyester resin (A) used for the invention is the basic resin component in the powder primer composition of the invention, and the carboxyl group in the resin reacts with the epoxy groups in the epoxy resin (B1) or (B2) during baking of the coating film, or when using the phosphoric acid-modified epoxy resin (D) described hereunder, it reacts with the epoxy groups in the resin (D), to form a cured coating film.

A polyester resin (A) with a number-average molecular weight in the range of 400-20,000 and preferably 1000-15,000 is most suitable from the standpoint of coating film durability and smoothness. The number-average molecular weight referred to here is the value determined as the number-average molecular weight measured by gel permeation chromatography (GPC) using tetrahydrofuran as the solvent, with a flow rate of 1.0 ml/min and a measuring temperature of 40° C., and calculating with respect to the number-average molecular weight of polystyrene. The GPC apparatus used was a HLC8120GPC (trade name of Tosoh Corp.), and four columns were used for GPC, namely "TSKgel G-2500H×L", "TSKgel G-3000H×L", "TSKgel G-2500H×L", and "TSKgel G-2000H×L" (all products of Tosoh Corp.).

The softening temperature of the polyester resin (A) is 30-140° C. and preferably 40-100° C. from the standpoint of storage stability and coating film smoothness. The softening temperature can be measured, using a ring and ball automatic softening point tester (product of Meiho Co., Ltd.), as the temperature (° C.) at which, during temperature increase at a rate of 3° C./min in a glycerin heating bath, the sample softens to a degree allowing the ball to drop.

The acid value of the polyester resin (A) is preferably in the range of 10-200 mgKOH/g and especially 20-150 mgKOH/g, from the standpoint of the curability, water resistance, chipping resistance and corrosion resistance.

As specific examples for polyester resin (A) there may be mentioned resins obtained by appropriate reaction between aromatic, alicyclic or aliphatic dicarboxylic acids such as phthalic acid (or anhydride), isophthalic acid, terephthalic acid, dimethyl isophthalate, dimethyl terephthalate, hexahydrophthalic acid (or anhydride), tetrahydrophthalic acid (or anhydride), adipic acid and sebacic acid, and dihydric alcohols such as (poly)ethylene glycol, (poly)propyleneglycol, butyleneglycol, neopentyl glycol, 1,6-hexanediol and dimethylolpropionic acid, if necessary with a monocarboxylic acid such as benzoic acid, a tribasic or greater carboxylic acid such as trimellitic acid (or anhydride) or a trihydric or greater alcohol such as trimethylolethane, trimethylolpropane, glycerin or pentaerythritol, so that the acid value is within the range specified above.

The epoxy resin (B1) used for the invention is a bisphenol A-type epoxy resin with an epoxy equivalent of 400-2000 g/eq and preferably 600-1500 g/eq.

An epoxy equivalent of less than 400 is not preferred because the resin will be liquid at ordinary temperature, rendering it difficult to use as a powder coating, while an epoxy equivalent of greater than 2000 is not preferred because it will raise the softening point. The epoxy groups in the epoxy resin (B1) react with the carboxyl groups in the polyester resin (A) to form a cured coating film.

The epoxy resin (B1) used is preferably a resin with a softening point of 50-140° C. and preferably 60-130° C., and a number-average molecular weight in the range of 800-4000 and preferably 1200-3000. The softening temperature and number-average molecular weight may be measured using the methods employed for the polyester resin (A).

As specific examples for epoxy resin (B1) there may be mentioned resins such as jER1001, jER1002, jER1004, jER1007 (all products of Japan Epoxy Resins Co., Ltd.); EPICLON AM-020-P and EPICLON AM-040-P (products of Dainippon Ink and Chemicals, Inc.); EPOTOTE YD-012, EPOTOTE YD-013 and EPOTOTE YD-014 (all products of Tohto Kasei Co., Ltd.); and ARALDITE AER6084, ARALDITE AER6072, ARALDITE AER6003 (all products of Asahi Kasei Chemicals Corp.). According to the invention, any one or combination of two or more of these may be selected for use, although there is no restriction to these.

The epoxy resin (C1) used for the invention is a bisphenol F-type epoxy resin with an epoxy equivalent of 400-2000 g/eq and preferably 600-1500 g/eq.

An epoxy equivalent of less than 400 is not preferred because the resin will be liquid at ordinary temperature, rendering it difficult to use as a powder coating, while an epoxy equivalent of greater than 2000 is not preferred because it will raise the softening point. The epoxy groups in the epoxy resin (C1) react with the carboxyl groups in the polyester resin (A) to form a cured coating film. The epoxy resin (C1) used is preferably a resin with a softening point of 50-140° C. and preferably 60-130° C., and a number-average molecular weight in the range of 800-4000 and preferably 1200-3000. The softening temperature and number-average molecular weight may be measured using the methods employed for the polyester resin (A).

As specific examples for the epoxy resin (C1) there may be mentioned resins such as jER4004P, jER4005P and jER4007P (all products of Japan Epoxy Resins Co., Ltd.); EPICLON FQ-041-P and EPICLON FQ-065-P (products of Dainippon Ink and Chemicals, Inc.); and EPOTOTE YDF-170, EPOTOTE YDF-175S, EPOTOTE YDF-2001 and EPOTOTE YDF-2004 (all products of Tohto Kasei Co., Ltd.). According to the invention, any one or combination of two or more of these may be selected for use, although there is no restriction to these.

In the powder primer composition of the invention, the ratio of the contents of the epoxy resin (B1) and epoxy resin (C1) is preferably such that epoxy resin (B1)/epoxy resin (C1) is in the range of 25/75-75/25 and preferably 25/75-50/50, based on the solid weight of both components. Their contents are preferably not outside of this range because the corrosion resistance and blocking resistance of the formed coating film will be reduced.

The epoxy resin (B2) used for the invention is a bisphenol-type epoxy resin with an epoxy equivalent of 400-2000 g/eq and preferably 600-1500 g/eq. An epoxy equivalent of less than 400 is not preferred because the resin will be liquid at ordinary temperature, rendering it difficult to use as a powder coating, while an epoxy equivalent of greater than 2000 is not preferred because it will raise the softening point. The epoxy groups in the epoxy resin (B2) react with the carboxyl groups in the polyester resin (A) to form a cured coating film.

The epoxy resin (B2) used is preferably a resin with a softening point of 50-140° C. and preferably 60-130° C., and a number-average molecular weight in the range of 800-4000 and preferably 1200-3000.

The epoxy resin (B2) is preferably a bisphenol-type epoxy resin such as a bisphenol A-type epoxy resin or bisphenol F-type epoxy resin.

As specific examples of bisphenol A-type epoxy resins there may be mentioned resins such as jER1001, jER1002, jER1004 and jER1007 (all products of Japan Epoxy Resins Co., Ltd.); EPICLON AM-020-P and EPICLON AM-040-P (products of Dainippon Ink and Chemicals, Inc.); EPOTOTE YD-012, EPOTOTE YD-013 and EPOTOTE YD-014 (all products of Tohto Kasei Co., Ltd.); and ARALDITE AER6084, ARALDITE AER6072 and ARALDITE AER6003 (all products of Asahi Kasei Chemicals Corp.).

As examples of bisphenol F-type epoxy resins there may be mentioned jER4004P, jER4005P and jER4007P (all products of Japan Epoxy Resins Co., Ltd.); EPICLON FQ-041-P and EPICLON FQ-065-P (products of Dainippon Ink and Chemicals, Inc.); and EPOTOTE YDF-2001 and EPOTOTE YDF-2004 (products of Tohto Kasei Co., Ltd.).

According to the invention, any one or combination of two or more of the aforementioned resins may be selected for use, although there is no restriction to these.

The use of both a bisphenol A-type epoxy resin and a bisphenol F-type epoxy resin in a specific proportion as the epoxy resin (B2) can yield a coating film with reduced internal stress of the formed coating film and excellent corrosion resistance, top coating film adhesion and finished appearance. From the standpoint of corrosion resistance and water resistance of the coating film, the blending ratio is preferably such that the bisphenol A-type epoxy resin/bisphenol F-type epoxy resin ratio is in the range of 25/75-75/25 and preferably 30/70-70/30 based on the solid weights of each.

The blending proportion of the epoxy resin (B2) with respect to the polyester resin (A) according to the invention is preferably selected so that the epoxy resin (B2) has 0.5-1.5 equivalents of epoxy groups with respect to 1 equivalent of carboxyl groups in the polyester resin (A).

The modified epoxy resin (C2) used for the invention is obtained by reacting (a) a bifunctional epoxy resin with (b) an excess of a bifunctional phenol, and it includes phenolic hydroxyl groups at both ends but contains no epoxy groups reactive with the polyester resin (A).

As examples for the bifunctional epoxy resin (a) to be used in the modified epoxy resin (C2) there may be mentioned bisphenol-type epoxy resins such as bisphenol A-type epoxy resins and bisphenol F-type epoxy resins; diglycidyl ethers of diols such as hydrogenated bisphenol A, 1,6-hexanediol and polypropyleneglycol; and diglycidyl esters of dimer acids, among which bisphenol-type epoxy resins are preferred. Specifically, there may be mentioned those cited above for epoxy resin (B2).

As examples of bifunctional phenols (b) to be used in the modified epoxy resin (C2) there may be mentioned bisphenol A, bisphenol F, bisphenol S, bisphenol C, tetrabromobisphenol A, catechol, resorcin, hydroquinone and the like. Preferred among these are bisphenol A and bisphenol F.

Suitable modified epoxy resins (C2) include those obtained by using a bisphenol A-type epoxy resin as the bifunctional epoxy resin (a) and reacting it with bisphenol A as the bifunctional phenol (b); those obtained by using a bisphenol A-type epoxy resin as the bifunctional epoxy resin (a) and reacting it with bisphenol F as the bifunctional phenol (b); and those obtained by using a bisphenol F-type epoxy resin as the bifunctional epoxy resin (a) and reacting it with bisphenol A as the bifunctional phenol (b).

As specific examples of resins obtained by reacting an excess of a bifunctional phenol (b) with the aforementioned bifunctional epoxy resin (a) there may be mentioned resins such as jERCURE170, jERCURE171, jERCURE171N and jERCURE172 (all products of Japan Epoxy Resins Co., Ltd.), and AER5005, AER5007VS50 and AER5009 (all products of Asahi Kasei Chemicals Corp.). According to the invention, any one or combination of two or more of these may be selected for use, although there is no restriction to these.

It is effective from the standpoint of curability for the amount of the modified epoxy resin (C2) added to be 1-20 parts by mass and preferably 3-15 parts by mass with respect to 100 parts by mass as the total solid content of the polyester resin (A), epoxy resin (B2) and modified epoxy resin (C2), also including the phosphoric acid-modified epoxy resin (D) (described hereunder) when it is used.

The powder primer composition of the invention comprises the polyester resin (A), epoxy resin (B1) or (B2) and modified epoxy resin (C1) or (C2) as essential components, but from the standpoint of water resistance it preferably also comprises (D) a phosphoric acid-modified epoxy resin.

The phosphoric acid-modified epoxy resin (D) is preferably obtained by reacting (c) a phosphoric acid ester compound with at least one P—OH bond in the molecule, obtained by reacting a monoglycidyl ether compound and/or monoglycidyl ester compound with phosphoric acid, and (d) an epoxy compound with at least one epoxy group in the molecule. The monoglycidyl ether compound may be a compound represented by the following general formula (I), and the monoglycidyl ester compound may be a compound represented by the following general formula (II).

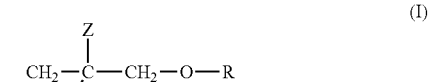

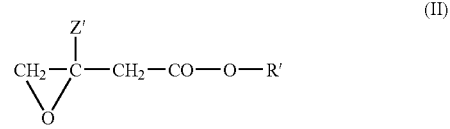

(wherein R and R' represent alkyl, alkenyl or aryl, and Z and Z' represent hydrogen or methyl)

As examples of alkyl groups represented by R and R' in general formulas (I) and (II) above there may be mentioned straight-chain or branched alkyl groups such as methyl, ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl and behenyl, as alkenyl groups there may be mentioned the aforementioned alkyl groups having 1-3 unsaturated bonds in the molecule, and as aryl groups there may be mentioned phenyl and naphthyl, where the aryl groups may be substituted with 1-3 of the aforementioned alkyl groups, and the substituents may be bonded together to form a ring.

The monoglycidyl ether compound represented by general formula (I) and the monoglycidyl ester compound represented by general formula (II) may be easily obtained by ordinary processes from epichlorhydrin and alcohols, phenols or organic carboxylic acids.

As specific examples of monoglycidyl ether compounds represented by general formula (I) there may be mentioned methylglycidyl ether, butylglycidyl ether, 2-ethylhexylglycidyl ether, sec-butylphenylglycidyl ether, 2-methyloctylglycidyl ether, octadecylglycidyl ether, phenylglycidyl ether, tolylglycidyl ether and octylphenylglycidyl ether.

As specific examples of monoglycidyl ester compounds represented by general formula (II) there may be mentioned glycidyl ester compounds of monocarboxylic acids such as acetic acid, propionic acid, butyric acid, valeric acid, caproic acid, enanthic acid, caprylic acid, pelargonic acid, 2-ethylhexylic acid, neodecanoic acid, capric acid, undecanoic acid, lauric acid, tridecanoic acid, myristic acid, palmitic acid, isothrearic acid, stearic acid, 12-hydroxystearic acid, behenic acid, montanic acid, acrylic acid, methacrylic acid, crotonic acid, elaidic acid, oleic acid, linolenic acid, linoleic acid, benzoic acid, p-tert-butylbenzoic acid, toluic acid, dimethylbenzoic acid, ethylbenzoic acid, cuminic acid and n-propylbenzoic acid.

As examples of phosphoric acids there may be mentioned orthophosphoric acid, metaphosphoric acid, pyrophosphoric acid, phosphorous acid, polyphosphoric acid, phosphonic acid, methanephosphonic acid, benzenephosphonic acid, 1-hydroxyethane-1,1-diphosphonic acid and phosphinic acid.

In order to obtain the phosphoric acid ester compound (c), it is preferred from the standpoint of coatability to use the phosphoric acid and the monoglycidyl ether compound represented by general formula (I) or the monoglycidyl ester compound represented by general formula (II) in amounts for 0.1-0.9 equivalent and preferably 0.3-0.8 equivalent of epoxy groups (epoxy equivalent) in the compound of general formula (I) or (II) with respect to 1 equivalent of P—OH groups of the phosphoric acid.

The epoxy compound (d) used in the phosphoric acid-modified epoxy resin (D) is a resin with two or more epoxy groups in the molecule, and a known compound may be used. Specifically there may be mentioned glycidyl ethers of epihalohydrins such as epichlorhydrin and aliphatic polyhydroxy compounds (for example, glycol or glycerin); glycidyl ethers of epihalohydrins such as epichlorhydrin and aromatic polyhydroxy compounds (for example, bisphenol A, bisphenol F, novolac-phenol, cresol-phenol and the like); glycidyl ethers of epihalohydrins such as epichlorhydrin and alicyclic polyhydroxy compounds (for example, hydrogenated bisphenol A and the like); glycidyl ethers of epihalohydrins such as epichlorhydrin and aromatic polycarboxylic acid compounds (for example, phthalic acid and the like); epoxidated oils, alicyclic epoxy resins, and the like.

The amount of the phosphoric acid ester compound (c) used in the phosphoric acid-modified epoxy resin (D) is not particularly restricted so long as it is in a range so that epoxy groups remain in the addition product, but normally from the standpoint of water resistance, it is preferred to be an amount for 0.01-0.8 equivalent and especially 0.03-0.5 equivalent of P—OH groups in the phosphoric acid ester compound (c) with respect to one equivalent of epoxy groups in the epoxy compound (d).

The phosphoric acid-modified epoxy resin (D) preferably has a number-average molecular weight in the range of 300-2000 and an epoxy equivalent in the range of 150-2100.

The blending proportion of the phosphoric acid-modified epoxy resin (D) is preferably 0.5-30 parts by mass and especially 1-20 parts by mass with respect to 100 parts by mass as the total of the polyester resin (A), epoxy resin (B1) or (B2) and modified epoxy resin (C1) or (C2). At less than 0.5 part by weight the adhesion with the base material may be reduced, and at greater than 30 parts by mass the coating film water resistance may be lowered.

The powder primer composition of the invention may also contain (E) a hydroxyl group-containing polymer if necessary. The hydroxyl group-containing polymer (E) may be one that is known in the prior art, so long as it is a polymer with an average of at least one hydroxyl group per molecule. The hydroxyl group-containing polymer (E) includes polymers of hydroxyl group-containing radical polymerizing unsaturated monomers, and copolymers of the monomers with other radical polymerizing unsaturated monomers as necessary.

As examples of hydroxyl group-containing radical polymerizing unsaturated monomers there may be mentioned C2-8 hydroxyalkyl esters of acrylic acid or methacrylic acid, such as 2-hydroxyethyl (meth)acrylate, 3-hydroxypropyl (meth)acrylate and hydroxybutyl (meth)acrylate; monoesters of polyether polyols such as polyethylene glycol, polypropylene glycol and polybutylene glycol with unsaturated carboxylic acids such as (meth)acrylic acid; addition products of alkylene oxides such as ethylene oxide, propylene oxide and butylene oxide and hydroxyl-containing unsaturated monomers such as 2-hydroxyethyl (meth)acrylate; monoesters or diesters of acid anhydride group-containing unsaturated compounds such as maleic anhydride and itaconic anhydride with glycols such as ethylene glycol, 1,6-hexanediol and neopentyl glycol; hydroxyalkylvinyl ethers such as hydroxyethylvinyl ethers; allyl alcohols and the like; addition products of $\alpha,\beta$-ethylenically unsaturated carboxylic acids and CARDURA E10 (trade name of Japan Epoxy Resins Co., Ltd.), or monoepoxy compounds such as $\alpha$-olefin epoxides; addition products of glycidyl (meth)acrylate and monobasic acids such as acetic acid, propionic acid, p-tert-butylbenzoic acid and fatty acids; and addition products of the aforementioned hydroxyl-containing monomers and lactones (for example, $\epsilon$-caprolactone or $\gamma$-valerolactone). These monomers may be used alone or in combinations of two or more. Among those cited, (meth)acrylate-based unsaturated monomers are especially preferred, and 2-hydroxyethyl (meth)acrylate and 3-hydroxypropyl (meth)acrylate are even more preferred.

As examples of other radical polymerizing unsaturated monomers there may be mentioned vinyl aromatic compounds such as styrene, $\alpha$-methylstyrene, vinyltoluene and $\alpha$-chlorostyrene, and C1-24 alkyl esters or cycloalkyl esters of acrylic acid or methacrylic acid such as methyl (meth)acrylate, ethyl (meth)acrylate, n-butyl (meth)acrylate, i-butyl (meth)acrylate, tert-butyl (meth)acrylate, 2-ethylhexyl (meth)acrylate, n-octyl (meth)acrylate, decyl (meth)acrylate, lauryl (meth)acrylate, stearyl (meth)acrylate, cyclohexyl (meth)acrylate, isobornyl (meth)acrylate and tricyclodecanyl (meth)acrylate.

The hydroxyl group-containing polymer (E) preferably has a number-average molecular weight in the range of 1000-10,000 and especially 2000-6000 from the standpoint of film performance such as solvent resistance and acid resistance, and finished appearance including smoothness of the coating film. The number-average molecular weight may be measured using the method employed for the polyester resin (A) explained above.

The hydroxyl group-containing polymer (E) is most preferably a copolymer, and the blending proportion of the hydroxyl group-containing radical polymerizing unsaturated monomer with respect to the monomers composing the copolymer is preferably in the range of 5-40 mass % and most preferably in the range of 10-30 mass %, from the standpoint of finished appearance including smoothness of the coating film.

From the standpoint of finished appearance, adhesion and curability, the content of the hydroxyl group-containing polymer (E) is preferably 0.1-20 parts by mass and more preferably 0.5-15 parts by mass with respect to 100 parts by mass of the total solid content including the polyester resin (A), epoxy resin (B1) or (B2) and modified epoxy resin (C1) or (C2), as well as the phosphoric acid-modified epoxy resin (D) mentioned above when used.

The powder primer composition of the invention may also contain a rust-preventive agent if necessary. The rust-preventive agent used may be any one known in the prior art. For example, there may be mentioned aluminum tripolyphosphate, silica, tannic acid, phytic acid, benzotriazole, ammonium metavanadate, ammonium zirconium carbonate, lithium hydroxide and the like, although there is no particular restriction to these.

The powder primer composition of the invention may also contain, if necessary, color pigments, extender pigments, other fillers, curing catalysts, flow property adjustors, anticissing agents, anti-popping agents, ultraviolet absorbers, light stabilizers and the like.

The powder primer composition of the invention may be produced by a method known in the prior art involving, for example, combining the aforementioned components (A), (B1) or (B2) and (C1) or (C2) and blending them with a mixer, and then performing hot melt kneading followed by cooling, fine pulverization and filtration.

Electrostatic powder coating of the powder primer composition of the invention onto an article to be coated composed of a metal material can be carried out to form a primer coating film layer. The article used for coating may be a known metal material such as an aluminum wheel.

The powder primer composition of the invention has a mean particle size of 10-100 μm, and preferably it is in the range of 15-40 μm from the standpoint of coated surface smoothness. The mean particle size referred to here may be measured using a MICROTRAC 9220FRA or MICROTRAC HRA, produced by Nikkiso Co., Ltd. The mean particle size is the value of the particle size with an integrated value of 50% from the small particle size end (D50).

The coated film thickness of the powder primer composition of the invention is not particularly restricted but it is preferably in the range of about 50-150 μm and especially 70-110 μm from the standpoint of coating film appearance and coating film smoothness.

When the powder primer composition of the invention is used to form a coating film, the composition may be powder coated onto an article to be coated and baked to cure the coating film. Suitable baking conditions are 150-200° C. for 15-40 minutes, and preferably 160-180° C. for 15-30 minutes.

According to the invention, a coloring base coating film layer may be formed on the surface of the primer layer. A coloring base coating film layer can impart a design property when the coating film made of the coloring base coating is formed as the top coating film on an aluminum wheel. For outdoor purposes, the coloring base coating is preferably one employing a resin with excellent weather resistance as the coating film-forming resin since the formed coating film will be exposed to ultraviolet rays, water and heat, and examples of such resins include acrylic thermosetting resins, polyester-based thermosetting resins and acrylic-polyisocyanate curing resins, while the coating form may be a solvent-type coating, a water-based coating or powder coating, or either a one-pack coating or two-pack coating.

The coloring base coating may also contain color pigments or brightness pigments for enhanced design properties. As examples of color pigments there may be mentioned titanium dioxide, iron oxide, iron oxide red, carbon black, phthalocyanine blue, phthalocyanine green, quinacridone-based pigments, isoindoline-based pigments, azo-based pigments, acetolone-based pigments and various firing pigments, although there is no restriction to these.

There are no particular restrictions on brightness pigments so long as they reflect incoming light and impart luster to the coating film, but as preferred examples there may be mentioned one or more selected from the group consisting of metal powders such as aluminum powder, metal flakes such as stainless steel flakes, mica, micaceous iron oxide (MIO), glass flakes, colored pearl pigments and pearl pigments. Color pigments and brightness pigments may be used alone or in combination.

In the case of a liquid coating such as a solvent-type or aqueous coating, the coloring base coating film will usually be formed by spray application, while for powder coating there may be employed an electrostatic powder coating method. For a baking liquid coating, the baking may be performed at 120-160° C. to produce a post-baking film thickness of 10-50 μm. According to the invention, a top clear coating film layer may further be formed on the coloring base coating film layer surface. Laminating a top clear coating film layer can impart weather resistance, produce a superior finished appearance with high luster, and exhibit excellent film performance such as mar resistance and chemical resistance.

The material used to form the top clear coating film layer may be an acrylic solvent-type clear coating, an acrylic solvent-type high solid clear or two-pack hydroxyl group-containing acrylic polyisocyanate curing resin clear coating, an ultraviolet (UV) curable coating, an acrylic powder coating or an acrylic-melamine curable coating, which coatings are ordinarily used as top coats for automobile bodies, automobile parts and the like.

The material used as the top clear is usually applied by spray coating, when it is a solvent-type clear coating material. The baking conditions are 120-160° C., maintained for 10-40 minutes. The post-drying thickness is 20-50 μm.

In the case of an acrylic solvent-type clear composed of a two-pack hydroxyl group-containing acrylic polyisocyanate curing resin, low-temperature curing may be carried out at 60-80° C. The application may be accomplished by spray coating to a dry film thickness of 20-50 μm.

With an ultraviolet (UV) curable coating, curing may be accomplished in a short time by ultraviolet irradiation at 10-400 mJ/cm$^2$. A UV curable coating may comprise both a functional group that crosslinks by UV irradiation and a functional group that crosslinks by heat. The application is carried out by spray coating to a dry film thickness of 20-50 μm.

When an acrylic powder coating (for example, EVERCLAD NO. 5600DK, an epoxy group-containing acrylic resin-dodecanedioic acid curable acrylic powder coating by Kansai Paint Co., Ltd.) is used as the top clear, no harmful organic solvents will be emitted, thus allowing the method of forming a coating film to generate minimal emission of organic solvents including the powder primer. In addition, since recovery and reuse is possible as with the powder primer, the efficiency of use is increased and a major economical effect is achieved. The coated film thickness of the powder top clear is 50-150 μm and preferably 70-110 μm as the film thickness after heating. The baking will usually be carried out at 140-180° C. for 10-40 minutes.

The invention will now be explained in greater detail using examples and comparative examples, with the understanding that the invention is in no way limited in scope by the examples. Unless otherwise specified, the "parts" and "%" values throughout the examples represent parts by mass and mass %.

Preparation of Powder Primer Composition

EXAMPLES 1-5 And COMPARATIVE EXAMPLES 1-3

The components listed in Table 1 were mixed with a mixer in the amounts listed in the table, and the mixture was melt kneaded with an extruder and cooled, after which it was finely pulverized with an atomizer and filtered at 150 mesh to obtain powder primer compositions for Examples 1-5 and Comparative Examples 1-3. The coating compounding ingredients listed in Table 1 are described below.

TABLE 1

| | | | Example | | | | | Comp. Ex. | | |
|---|---|---|---|---|---|---|---|---|---|---|
| | | | 1 | 2 | 3 | 4 | 5 | 1 | 2 | 3 |
| Coating composition | Component (A) | Polyester resin | 50 | 50 | 50 | 50 | 50 | 50 | 50 | 50 |
| | Component (B) | Bisphenol A-type epoxy resin | 25 | 17.5 | 32.5 | 23 | 23 | 50 | 40 | 10 |
| | Component (C) | Bisphenol F-type epoxy resin | 25 | 32.5 | 17.5 | 23 | 23 | 0 | 10 | 40 |
| | Component (D) | Phosphoric acid-modified epoxy resin | | | | 4 | 4 | | | |
| | Component (E) | Hydroxyl group-containing polymer | | | | | 1 | | | |
| | | Titanium oxide | 40 | 40 | 40 | 40 | 40 | 40 | 40 | 40 |
| | | Benzoin | 0.5 | 0.5 | 0.5 | 0.5 | 0.5 | 0.5 | 0.5 | 0.5 |
| Tested properties | | Coated film appearance | G | G | G | G | G | G | G | G |
| | | Adhesiveness | G | G | G | G | G | G | G | G |
| | | Corrosion resistance (ordinary section) | G | G | G | G | G | F | F | G |
| | | Corrosion resistance (cut section) | VG | VG | G | VG | VG | P | F | VG |
| | | Blocking resistance | G | G | G | G | G | G | G | F |

Polyester resin: FINEDIC M-8871, trade name of Dainippon Ink and Chemicals, Inc., carboxyl group-containing thermosetting polyester resin, softening temperature: 104° C., acid value: 70 mgKOH/g.

Bisphenol A-type epoxy resin: jER1004, trade name of Japan Epoxy Resins Co., Ltd., epoxy equivalent: 875-975 g/eq.

Bisphenol F-type epoxy resin: jER4005P, trade name of Japan Epoxy Resins Co., Ltd., epoxy equivalent: 950-1200 g/eq.

Phosphoric Acid-Modified Epoxy Resin:

(1) Production of epoxy compound: 190 parts of ADEKARESIN EP-4100 (trade name of Adeka Corp., bisphenol A-type epoxy resin, epoxy equivalent: 190), 58 parts of bisphenol A and 1 part of dimethylbenzylamine were combined and reacted at 150° C. for 8 hours to obtain an epoxy compound with an epoxy equivalent of 500.

(2) Production of phosphoric acid ester compound: 280 parts of butylglycidyl ether was added to 115 parts of 85% phosphoric acid, and the mixture was reacted at 50-60° C. for 3 hours to obtain a phosphoric acid ester compound with an acid value of 142 mgKOH/g.

(3) Production of phosphoric acid-modified epoxy resin: To the epoxy compound obtained in the manner described above there were added 115 parts of xylene and 20 parts of the phosphoric acid ester compound obtained in the manner described above, and the mixture was reacted at 80° C. for 5 hours while allowing xylene to flow out from the reactor. This was followed by cooling to obtain a phosphoric acid-modified epoxy resin.

Hydroxyl group-containing polymer: After charging 60 parts of toluene into a flask, the temperature was raised to 105° C. while introducing nitrogen gas, and then a mixture of 30 parts styrene, 35 parts methyl methacrylate, 10 parts isobutyl methacrylate, 25 parts 2-hydroxyethyl methacrylate and 4 parts azobisisobutyronitrile was added dropwise over a period of about 3 hours. Upon completion of the dropwise addition, the mixture was allowed to stand at 105° C. for 1 hour, and then a solution of 0.5 part azobisisobutyronitrile in 10 parts toluene was added dropwise over a period of 1 hour, and upon completion of the dropwise addition the mixture was aged at 105° C. for 1 hour. This was followed by drying under reduced pressure to remove the solvent in the system, thereby obtaining a hydroxyl group-containing polymer with a softening temperature of 54° C. and a number-average molecular weight of 3500.

Titanium oxide: JR605, trade name of Tayca Corp.

EXAMPLES 6-12 AND COMPARATIVE EXAMPLES 4 AND 5

The components listed in Table 2 were mixed with a mixer in the amounts listed in the table, and the mixture was melt kneaded with an extruder and cooled, after which it was finely pulverized with an atomizer and filtered at 150 mesh to obtain powder primers for Examples 6-12 and Comparative Examples 4 and 5. The coating compounding ingredients listed in Table 2 are described below.

TABLE 2

|  |  |  | Example |  |  |  |  |  |  | Comp. Ex. |  |
|---|---|---|---|---|---|---|---|---|---|---|---|
|  |  |  | 6 | 7 | 8 | 9 | 10 | 11 | 12 | 4 | 5 |
| Coating composition | Component (A) | Polyester resin | 47.5 | 45 | 45 | 47.5 | 47.5 | 45 | 45 | 50 | 50 |
|  | Component (B) | Bisphenol A-type epoxy resin | 23.75 | 22.5 | 45 | 23.75 | 23.75 | 22.5 | 22.5 | 25 | 50 |
|  |  | Bisphenol F-type epoxy resin | 23.75 | 22.5 |  | 23.75 | 23.75 | 22.5 | 22.5 | 25 |  |
|  | Component (C) | Modified epoxy resin (C-1) | 5 | 10 | 10 |  |  |  |  |  |  |
|  |  | Modified epoxy resin (C-2) |  |  |  | 5 |  |  |  |  |  |
|  |  | Modified epoxy resin (C-3) |  |  |  |  | 5 |  |  |  |  |
|  | Component (D) | Phosphoric acid-modified epoxy resin |  |  |  |  |  | 5 | 5 |  |  |
|  | Component (E) | Hydroxyl group-containing polymer |  |  |  |  |  |  | 1 |  |  |
|  |  | Titanium oxide | 40 | 40 | 40 | 40 | 40 | 40 | 40 | 40 | 40 |
|  |  | Benzoin | 0.5 | 0.5 | 0.5 | 0.5 | 0.5 | 0.5 | 0.5 | 0.5 | 0.5 |
| Tested properties |  | Coated film appearance | G | G | G | G | G | G | G | G | G |
|  |  | Adhesiveness | G | G | G | G | G | G | G | G | G |
|  |  | Corrosion resistance (ordinary section) | G | G | G | G | G | G | G | F | F |
|  |  | Corrosion resistance (cut section) | G | VG | G | VG | VG | VG | VG | F | P |

Polyester resin: FINEDIC M-8871, trade name of Dainippon Ink and Chemicals, Inc., carboxyl group-containing thermosetting polyester resin, softening temperature: 104° C., acid value: 70 mgKOH/g.

Bisphenol A-type epoxy resin: jER1004, trade name of Japan Epoxy Resins Co., Ltd., epoxy equivalent: 875-975 g/eq.

Bisphenol F-type epoxy resin: jER4005P, trade name of Japan Epoxy Resins Co., Ltd., epoxy equivalent: 950-1200 g/eq.

Modified epoxy resin (C-1): phenolic hydroxyl group-containing modified epoxy resin obtained by reacting 2 moles of bisphenol A with one mole of a bisphenol A-type epoxy resin (jERCURE171, trade name of Japan Epoxy Resins Co., Ltd.).

Modified epoxy resin (C-2): Phenolic hydroxyl group-containing modified epoxy resin obtained by reacting 2 moles of bisphenol F with one mole of a bisphenol A-type epoxy resin (jER1001, trade name of Japan Epoxy Resins Co., Ltd.).

Modified epoxy resin (C-3): Phenolic hydroxyl group-containing modified epoxy resin obtained by reacting 2 moles of bisphenol A with one mole of a bisphenol F-type epoxy resin (jER4004P, trade name of Japan Epoxy Resins Co., Ltd.).

Phosphoric Acid-Modified Epoxy Resin:

(1) Production of epoxy compound: 190 parts of ADEKARESIN EP-4100 (trade name of Adeka Corp., bisphenol A-type epoxy resin, epoxy equivalent: 190), 58 parts of bisphenol A and 1 part of dimethylbenzylamine were combined and reacted at 150° C. for 8 hours to obtain an epoxy compound with an epoxy equivalent of 500.

(2) Production of phosphoric acid ester compound: 280 parts of butylglycidyl ether was added to 115 parts of 85% phosphoric acid, and the mixture was reacted at 50-60° C. for 3 hours to obtain a phosphoric acid ester compound with an acid value of 142 mgKOH/g.

(3) Production of phosphoric acid-modified epoxy resin: To the epoxy compound obtained in the manner described above there were added 115 parts of xylene and 20 parts of the phosphoric acid ester compound obtained in the manner described above, and the mixture was reacted at 80° C. for 5 hours while allowing xylene to flow out from the reactor. This was followed by cooling to obtain a phosphoric acid-modified epoxy resin.

Hydroxyl group-containing polymer: After charging 60 parts of toluene into a flask, the temperature was raised to 105° C. while introducing nitrogen gas, and then a mixture of 30 parts styrene, 35 parts methyl methacrylate, 10 parts isobutyl methacrylate, 25 parts 2-hydroxyethyl methacrylate and 4 parts azobisisobutyronitrile was added dropwise over a period of about 3 hours. Upon completion of the dropwise addition, the mixture was allowed to stand at 105° C. for 1 hour, and then 0.5 part azobisisobutyronitrile and 10 parts toluene were added dropwise over a period of 1 hour, and upon completion of the dropwise addition the mixture was aged at 105° C. for 1 hour. This was followed by drying under reduced pressure to remove the solvent in the system, thereby obtaining a hydroxyl group-containing polymer with a softening temperature of 54° C. and a number-average molecular weight of 3500.

Titanium oxide: JR605, trade name of Tayca Corp.

Evaluation Test

Each of the aforementioned powder primer compositions was evaluated in the following manner.

Coating film production conditions: The powder primers of the examples and comparative examples were coated by electrostatic powder coating to a cured film thickness of 100 μm on an aluminum alloy AC4C panel that had been subjected to chemical conversion treatment with chromate (AL-1000, trade name of Nihon Parkerizing Co., Ltd.), and each coating was heated at 180° C. for 20 minutes to form a coating film. A silver colored design coating containing a brightness pigment (aluminum pigment) (AL2500 11SV14: trade name of Kansai Paint Co., Ltd., acrylic solvent-type coating) was spray coated to a film thickness of 15 μm on the obtained powder primer coating film, and then, without heat curing, a solvent-type acrylic clear coating material (ALC-100: trade name of Kansai Paint Co., Ltd., solvent-type acrylic clear coating) was spray coated thereover to a film thickness of 35 μm, after which the coating was heat cured at 140° C. for 30 minutes. Each of the obtained baked coated panels was tested. The test results are shown in Tables 1 and 2.

Evaluation and Test Methods

Coating film appearance: After forming a coated panel under the coating film forming conditions described above, the finished appearance of the coating film was visually evaluated in terms of luster and smoothness, on the following scale. Good: (G), Fair: (F), Poor: (P)

Adhesion: After forming a coated panel under the coating film forming conditions described above, the test panel was dipped in hot water at 40° C. and raised after 240 hours, at which point the blistering, loss of luster and any abnormalities in the coated surface condition were observed, the coating film was cross-cut to the base with a cutter knife to create a grid with 100 1 mm×1 mm squares, a pressure-sensitive adhesive Cellophane™ tape was attached to the surface thereof, the tape was briskly peeled off and the number of squares of the coating film remaining were counted and evaluated according to the following scale. Good (G): No abnormalities in the surface condition, 100 squares of coating film remaining, satisfactory adhesion; Fair (F): Blistering and loss of luster, but 100 squares of coating film remaining and satisfactory adhesion; Poor (P): less than 99 or fewer squares of coating film remaining, poor adhesion.

Corrosion resistance: A portion of the test panel was cross-cut to the base and subjected to a salt spray test (JIS K5600-7-1) for 1000 hours in Examples 1-5 and Comparative Examples 1-3 and for 2000 hours in Examples 6-12 and Comparative Examples 4 and 5. After the test, the panel was rinsed and dried and examined for the condition of the ordinary sections and for the peel width and rust width of the coating film after attaching Cellophane™ tape to the cross-cut section and peeling off, and evaluation was conducted according to the following scale.

Ordinary section—Good (G): No abnormalities, Fair (F): rust points and blistering in some sections, Poor (P): rust points and blistering over entire surface.

Cut section peel width and rust width—Very good (VG): within 0.5 mm; Good (G): greater than 0.5 mm and within 1 mm; Fair (F): greater than 1 mm and within 5 mm; Poor (P): greater than 5 mm.

Blocking resistance: Each powder coating composition was placed in a 100 cc sample bottle and allowed to stand at 30° C. for two months, subsequently taken out, and then visually examined for the aggregated condition of the coating and evaluated according to the following scale. Good (G): no aggregation, Fair (F): some aggregation but easily pulverized, Poor (P): considerable aggregation, difficult to pulverize.

The present invention provides a powder primer composition that can form excellent coating films, and it is therefore industrially useful.

What we claim is:

1. A powder primer composition comprising:
   (A) a carboxyl group-containing polyester resin;
   (B1) a bisphenol A-type epoxy resin with an epoxy equivalent of 400-2000 g/eq;
   (C1) a bisphenol F-type epoxy resin with an epoxy equivalent of 400-2000 g/eq;
   (D) a phosphoric acid-modified epoxy resin; and
   (E) a hydroxyl group-containing polymer; wherein:
   the powder primer composition has a ratio of components (B1) to (C1) of 25/75-75/25 based on the solid weight of both components;
   the phosphoric acid-modified epoxy resin (D) is obtained by reacting (c) a phosphoric acid ester compound with at least one P—OH bond in the molecule, obtained by reacting a monoglycidyl ether compound and/or monoglycidyl ester compound with phosphoric acid, and (d) an epoxy compound with at least one epoxy group in the molecule;
   the hydroxyl group-containing polymer (E) is a polymer of hydroxyl group-containing radical polymerizing unsaturated monomers or copolymers of these monomers with other radical polymerizing unsaturated monomers; and
   the content of the hydroxyl group-containing polymer (E) is 0.1-20 parts by mass with respect to 100 parts by mass of the total solid content including the polyester resin (A), epoxy resin (B1), epoxy resin (C1) and phosphoric acid-modified epoxy resin (D).

2. The composition according to claim 1, wherein the hydroxyl group-containing radical polymerizing monomers are selected from the group consisting of:
   $C_{2-8}$ hydroxyalkyl esters of acrylic acid or methacrylic acid,
   monoesters of polyether polyols with unsaturated carboxylic acids,
   addition products of alkylene oxides and hydroxyl-containing unsaturated monomers,
   monoesters or diesters of acid anhydride group-containing unsaturated compounds with glycols,
   hydroxyalkylvinyl ethers,
   allyl alcohols,
   addition products of α,β-ethylenically unsaturated carboxylic acids and monoepoxy compounds,
   addition products of glycidyl (meth)acrylate and monobasic acids, and
   addition products of the above-mentioned hydroxyl-containing monomers and lactones.

3. The composition according to claim 2, wherein:
   the $C_{2-8}$ hydroxyalkyl esters of acrylic acid or methacrylic acid are 2-hydroxyethyl (meth) acrylate, 3-hydroxypropyl (meth)acrylate or hydroxybutyl (meth)acrylate;
   the monoesters of polyether polyols with unsaturated carboxylic acids are monoesters of polyethylene glycol, polypropylene glycol or polybutylene glycol esterified with (meth) acrylic acid;
   the addition products of alkylene oxides and hydroxyl-containing unsaturated monomers are the addition product of ethylene oxide, propylene oxide or butylene oxide and 2-hydroxyethyl (meth)acrylate;
   the monoesters or diesters of acid anhydride group-containing unsaturated compounds with glycols are monoesters or diesters of maleic anhydride or itaconic anhydride with ethylene glycol, 1,6-hexanediol or neopentyl glycol;
   the hydroxyalkylvinyl ethers are hydroxyethylvinyl ethers;
   the addition products of α,β-ethylenically unsaturated carboxylic acids and monoepoxy compounds are addition products of α,β-ethylenically unsaturated carboxylic acids and glycidyl neodecanoate or α-olefin epoxides;
   the addition products of glycidyl (meth)acrylate and monobasic acids are the addition products of glycidyl (meth)acrylate and acetic acid, propionic acid, p-tert-butylbenzoic acid or a fatty acid; and
   the addition products of the above-mentioned hydroxyl-containing monomers and lactones are addition products of the above-mentioned hydroxyl-containing monomers and ε-caprolactone or γ-valerolactone.

4. A method of forming a coating film comprising performing electrostatic powder coating of a powder primer composition according to claim 1 onto an article to be coated composed of a metal material, to form a primer coating film layer.

5. A method of forming a coating film according to claim 4, wherein the article to be coated is an aluminum wheel for an automobile.

6. A method of forming a coating film according to claim 4, which includes a step of forming a coloring base coating film layer onto the surface of the primer coating film layer.

7. A method of forming a coating film according to claim 6, which includes a step of forming a top clear coating film layer onto the surface of the coloring base coating film layer.

8. A powder primer composition comprising:
   (A) a carboxyl group-containing polyester resin;
   (B2) a bisphenol-type epoxy resin with an epoxy equivalent of 400-2000 g/eq containing a bisphenol A-type epoxy resin and a bisphenol F-type epoxy resin;
   (C2) a modified epoxy resin containing phenolic hydroxyl groups, obtained by reacting (a) a bifunctional epoxy resin with (b) an excess of a bifunctional phenol;
   (D) a phosphoric acid-modified epoxy resin; and
   (E) a hydroxyl group-containing polymer; wherein:
   the hydroxyl-group containing polymer (E) is a polymer of hydroxyl group-containing radical polymerizing unsaturated monomers or copolymers of these monomers with other radical polymerizing unsaturated monomers;
   the content of the hydroxyl-group containing polymer (E) is 0.1-20 parts by mass with respect to 100 parts by mass of the total solid content including the polyester resin (A), epoxy resin (B2), modified epoxy resin (C2) and phosphoric acid-modified epoxy resin (D); and
   the bisphenol-type epoxy resin (B2) has a blending ratio of the bisphenol A-type epoxy resin to the bisphenol F-type epoxy resin of 25/75-75/25.

9. A powder primer composition according to claim 8, wherein the bifunctional epoxy resin (a) is a bisphenol A-type epoxy resin with a number-average molecular weight of 500-2000, and the bifunctional phenol (b) is bisphenol A.

10. A powder primer composition according to claim 8, wherein the bifunctional epoxy resin (a) is a bisphenol A-type epoxy resin with a number-average molecular weight of 500-2000, and the bifunctional phenol (b) is bisphenol F.

11. A powder primer composition according to claim 8, wherein the bifunctional epoxy resin (a) is a bisphenol F-type epoxy resin with a number-average molecular weight of 1000-2000, and the bifunctional phenol (b) is bisphenol A.

12. The composition according to claim 8, wherein the hydroxyl group-containing radical polymerizing monomers are selected from the group consisting of:

$C_{2-8}$ hydroxyalkyl esters of acrylic acid or methacrylic acid, monoesters of polyether polyols with unsaturated carboxylic acids, addition products of alkylene oxides and hydroxyl-containing unsaturated monomers, monoesters or diesters of acid anhydride group-containing unsaturated compounds with glycols, hydroxyalkylvinyl ethers, allyl alcohols, addition products of $\alpha,\beta$-ethylenically unsaturated carboxylic acids and monoepoxy compounds, addition products of glycidyl (meth)acrylate and monobasic acids, and addition products of the above-mentioned hydroxyl-containing monomers and lactones.

13. The composition according to claim 12, wherein:
the $C_{2-8}$ hydroxyalkyl esters of acrylic acid or methacrylic acid are 2-hydroxyethyl (meth) acrylate, 3-hydroxypropyl (meth)acrylate or hydroxybutyl (meth)acrylate;
the monoesters of polyether polyols with unsaturated carboxylic acids are monoesters of polyethylene glycol, polypropylene glycol or polybutylene glycol esterified with (meth) acrylic acid;
the addition products of alkylene oxides and hydroxyl-containing unsaturated monomers are the addition product of ethylene oxide, propylene oxide or butylene oxide and 2-hydroxyethyl (meth)acrylate;
the monoesters or diesters of acid anhydride group-containing unsaturated compounds with glycols are monoesters or diesters of maleic anhydride or itaconic anhydride with ethylene glycol, 1,6-hexanediol or neopentyl glycol;
the hydroxyalkylvinyl ethers are hydroxyethylvinyl ethers;
the addition products of $\alpha,\beta$-ethylenically unsaturated carboxylic acids and monoepoxy compounds are addition products of $\alpha,\beta$-ethylenically unsaturated carboxylic acids and glycidyl neodecanoate or $\alpha$-olefin epoxides;
the addition products of glycidyl (meth)acrylate and monobasic acids are the addition products of glycidyl (meth)acrylate and acetic acid, propionic acid, p-tert-butylbenzoic acid or a fatty acid; and
the addition products of the above-mentioned hydroxyl-containing monomers and lactones are addition products of the above-mentioned hydroxyl-containing monomers and $\epsilon$-caprolactone or $\gamma$-valerolactone.

\* \* \* \* \*

UNITED STATES PATENT AND TRADEMARK OFFICE
CERTIFICATE OF CORRECTION

| | |
|---|---|
| PATENT NO. | : 7,858,153 B2 |
| APPLICATION NO. | : 11/790406 |
| DATED | : December 28, 2010 |
| INVENTOR(S) | : Kato et al. |

Page 1 of 1

It is certified that error appears in the above-identified patent and that said Letters Patent is hereby corrected as shown below:

Title Pg, Item (73) "Assignee: Kansai Paing Co., Ltd., Amagasaki-Shi (JP)" should read
-- Assignee: Kansai Paint Co., Ltd., Amagasaki-Shi (JP) --

Signed and Sealed this
Sixteenth Day of August, 2011

David J. Kappos
*Director of the United States Patent and Trademark Office*